US011181958B2

United States Patent
Kitanosako

(10) Patent No.: US 11,181,958 B2
(45) Date of Patent: Nov. 23, 2021

(54) ELECTRONIC DEVICE WITH POWER SOURCE CONTROL CIRUITRY FOR DETERMINING A CURRENT

(71) Applicant: CANON KABUSHIKI KAISHA, Tokyo (JP)

(72) Inventor: Hiroki Kitanosako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 16/456,986

(22) Filed: Jun. 28, 2019

(65) Prior Publication Data

US 2020/0004307 A1  Jan. 2, 2020

(30) Foreign Application Priority Data

Jul. 2, 2018 (JP) .............................. JP2018-126357

(51) Int. Cl.
*G06F 1/26* (2006.01)
*G06F 1/28* (2006.01)
*H02J 7/00* (2006.01)

(52) U.S. Cl.
CPC ................ G06F 1/263 (2013.01); G06F 1/28 (2013.01); *G06F 1/266* (2013.01); *G06F 2213/0042* (2013.01); *H02J 7/007* (2013.01); *H02J 7/0036* (2013.01); *H02J 7/0068* (2013.01); *H02J 2207/30* (2020.01); *H02J 2207/40* (2020.01)

(58) Field of Classification Search
CPC . G06F 1/25; G06F 1/263; G06F 1/266; G06F 1/28; G06F 1/3206; G06F 13/4063; G06F 13/4068; G06F 13/4081; G06F 1/26; G06F 2213/0042; H02J 7/0068; H02J 7/007; H02J 7/0036; H02J 2207/40; H02J 2207/30; H02J 7/02; H04N 5/2251; H04N 5/2257
See application file for complete search history.

(56) References Cited

U.S. PATENT DOCUMENTS

| | | | |
|---|---|---|---|
| 9,158,325 B1 * | 10/2015 | Lim ......................... | G01K 7/16 |
| 10,431,995 B2 * | 10/2019 | Moritomo ............. | H02J 7/0021 |
| 10,587,113 B2 * | 3/2020 | Morii ....................... | H02H 9/02 |
| 10,756,539 B2 * | 8/2020 | Morii ....................... | H02J 7/00 |
| 2017/0126029 A1 * | 5/2017 | Moritomo ............. | H02J 7/0044 |
| 2017/0220090 A1 * | 8/2017 | Kim .......................... | G06F 1/10 |
| 2017/0293335 A1 * | 10/2017 | Dunstan ................... | H02J 7/00 |
| 2018/0060201 A1 * | 3/2018 | Newberry ............... | G06F 1/266 |
| 2018/0069395 A1 * | 3/2018 | Morii ....................... | H01B 7/36 |
| 2018/0183234 A1 * | 6/2018 | Morii ....................... | H02J 7/00 |
| 2019/0204890 A1 * | 7/2019 | Kitanosako .......... | H02J 7/0071 |
| 2019/0204895 A1 * | 7/2019 | Kitanosako .......... | H02J 7/0068 |

(Continued)

FOREIGN PATENT DOCUMENTS

JP  2015-207155 A  11/2015

*Primary Examiner* — Thomas J. Cleary
(74) *Attorney, Agent, or Firm* — Cowan, Liebowitz & Latman P.C.

(57) ABSTRACT

An electronic device includes an interface unit having a first terminal and a second terminal, a determination unit that determines a power supply capability of an external device in accordance with a voltage of the second terminal, a power switching unit that determines a current in response to the voltage of the second terminal and a power supply capability of the external device, and a control unit that enables power supply from the external device to be performed with the determined current.

12 Claims, 5 Drawing Sheets

(56) References Cited

U.S. PATENT DOCUMENTS

| | | |
|---|---|---|
| 2019/0204896 A1* | 7/2019 | Kitanosako ................ G06F 1/28 |
| 2019/0207379 A1* | 7/2019 | Moritomo ............ H02H 1/0061 |
| 2019/0212795 A1* | 7/2019 | Moritomo ................ G06F 1/266 |
| 2020/0004307 A1* | 1/2020 | Kitanosako ................ H02J 7/02 |
| 2020/0004308 A1* | 1/2020 | Moritomo ................ G06F 1/266 |
| 2020/0004309 A1* | 1/2020 | Moritomo ................ G06F 1/28 |
| 2020/0278945 A1* | 9/2020 | Li ............................ G06F 1/28 |
| 2021/0034126 A1* | 2/2021 | Tsujimoto ........... G06F 13/4282 |
| 2021/0034139 A1* | 2/2021 | Tsujimoto ................ G06F 1/26 |

* cited by examiner

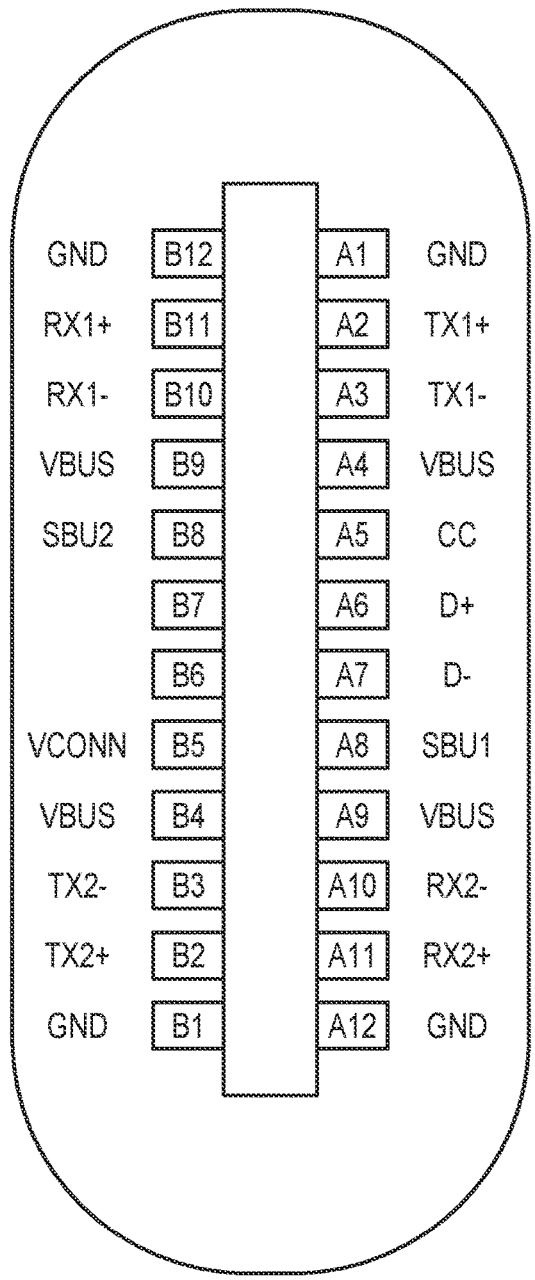
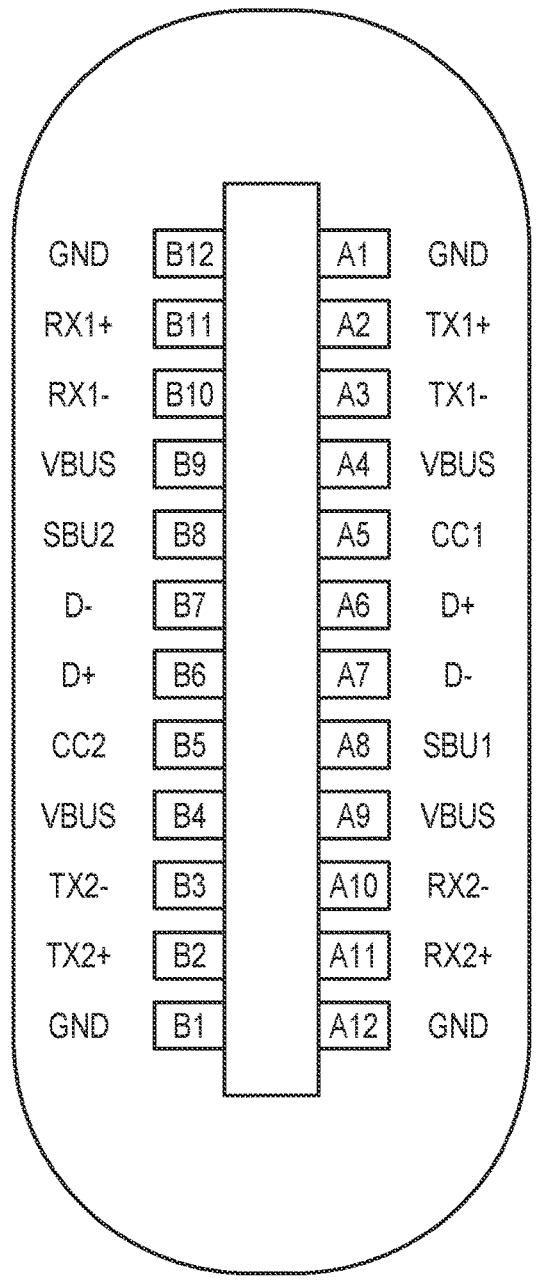

FIG. 5

| POWER SUPPLY CAPABILITY | CC TERMINAL VOLTAGE vRd |
|---|---|
| Default USB 500mA, 5V | 0.25V ≤ vRd < 0.66V |
| 1.5A, 5V | 0.66V ≤ vRd < 1.23V |
| 3A, 5V | 1.23V ≤ vRd ≤ 2.04V |

ELECTRONIC DEVICE WITH POWER SOURCE CONTROL CIRUITRY FOR DETERMINING A CURRENT

BACKGROUND

Field of the Disclosure

Aspects of the disclosure generally relate to an electronic device capable of acting as a wearable device (e.g., a wearable camera), a method of controlling the electronic device, or the like.

Description of the Related Art

By connecting a wearable camera to a docking station, image data can be transferred from the wearable camera to the docking station and the wearable camera can be charged. When the wearable camera is charged from the docking station, an AC power source or a power supply source of a host device or the like is connected to the docking station, and power is supplied from the power supply source to the wearable camera via the docking station. Here, when the power supply source connected to the docking station is disconnected or when a new power supply source is connected to the docking station, a capability to supply power from the docking station to the wearable camera (power supply capability) changes. Therefore, in order to safely charge the wearable camera, the power supply capability of the docking station needs to be determined, and the amount of power supply to be received needs to be quickly switched according to the power supply capability.

Japanese Patent Laid-Open No. 2015-207155 describes a method of detecting a connected device by detecting a change in a potential of a GND terminal by using a microcontroller.

However, Japanese Patent Laid-Open No. 2015-207155 cannot be used for detection of a connection of devices because it is a detection method using a GND terminal. Further, since the process is performed by software of the microcontroller, it is assumed that it takes a long time from the detection of the connected device to the switching of the power supply.

SUMMARY

According to an aspect of the embodiments, a device, a method, a program, and or like capable of shortening the time required for switching a power supply are provided.

According to an aspect of the embodiments, there is provided an electronic device comprising: an interface unit having a first terminal and a second terminal; a determination unit that determines a power supply capability of an external device in accordance with a voltage of the second terminal; a power switching unit that determines a current in response to the voltage of the second terminal and a power supply capability of the external device; and a control unit that enables power supply from the external device to be performed with the determined current.

Further aspects of the embodiments will become apparent from the following embodiments.

BRIEF DESCRIPTION OF THE DRAWINGS

FIGS. 2A and 2B are diagrams showing the arrangement of pins of a USB Type-C plug connector and receptacle connector.

FIG. 5 is a diagram showing the relationship between a CC terminal voltage defined by USB Type-C and a power supply capability.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
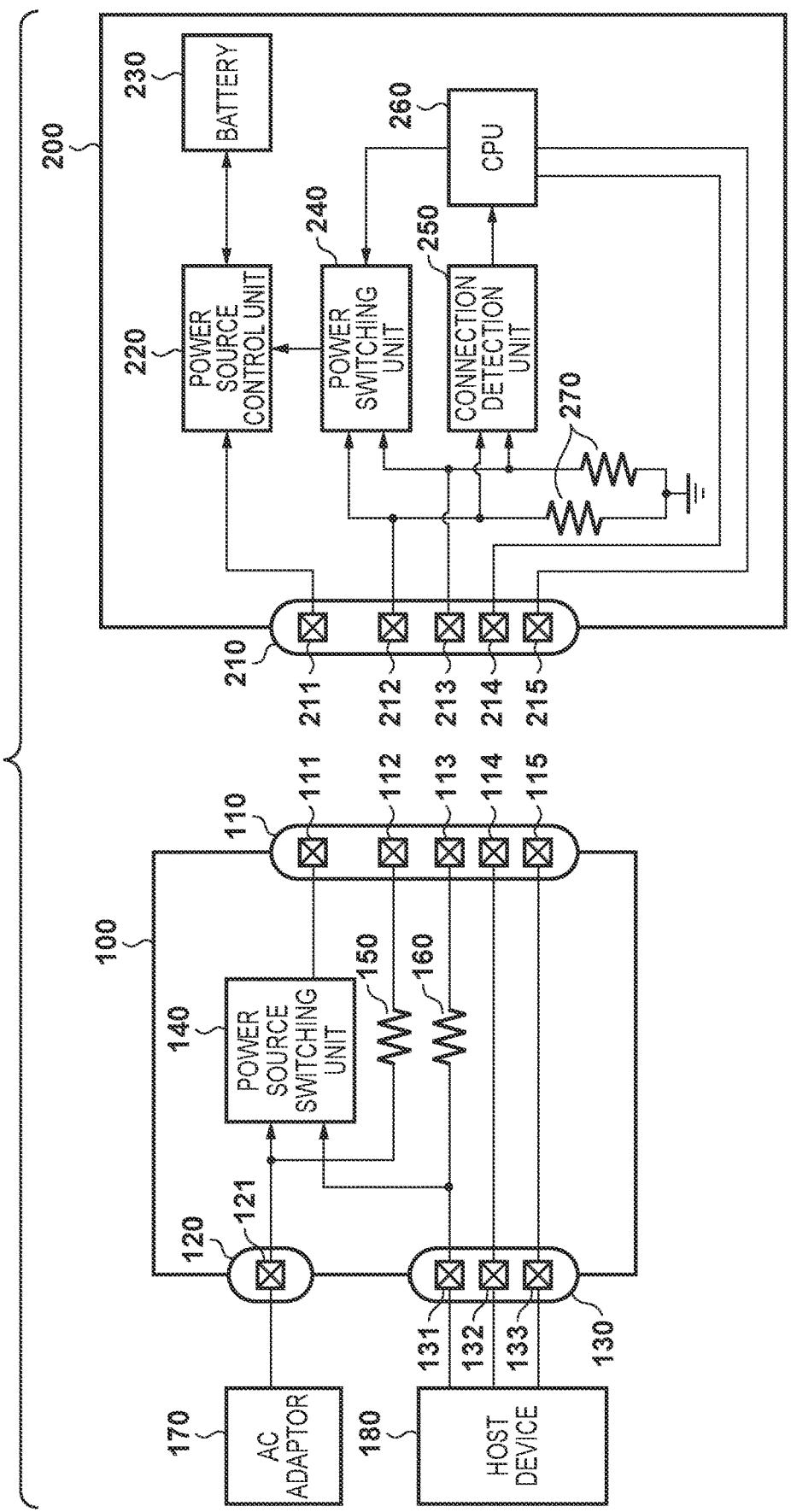
FIG. 1 is a block diagram for illustrating components of a docking station 100 and a wearable camera 200 according to a first embodiment.

FIG. 1 is a block diagram for illustrating components of a docking station 100 and a wearable camera 200 according to a first embodiment.

The docking station 100 has connectors 110, 120 and 130. The connector 110 is an interface connector to which an external device such as the wearable camera 200 can be connected. The connector 120 is a power source connector to which a power supply source such as an AC adaptor 170 connectable to a commercial power source can be connected. The connector 130 is an interface connector connectable to a power supply source such as a host device 180 such as a PC (personal computer).

The docking station 100 has a function of receiving data from the wearable camera 200 connected by an interface connector 110. Also, the docking station 100 has a function of supplying power to the wearable camera 200 or the like.

The wearable camera 200 has an interface connector 210 connectable to the interface connector 110 of the docking station 100. Note that the wearable camera 200 may be a wearable device such as glasses, goggles, or a wristwatch having a built-in camera, or may be an electronic device or an image capture apparatus such as an in-vehicle camera.

Connecting the interface connector 110 of the docking station 100 and the interface connector 210 of the wearable camera 200 allows power supply from the docking station 100 to the wearable camera 200 and data transmission/reception. Also, when the interface connector 110 is a USB (Universal Serial Bus) Type-C compliant connector and the devices are connected to each other by the connector, the connector can be inverted by 180 degrees and connected. However, in the first embodiment, it is assumed that the connector connection direction of the docking station 100 and the wearable camera 200 is determined, and connection after 180 degree inversion is not possible.

First, referring to FIG. 1, components of the docking station 100 will be illustrated. However, the docking station 100 has components other than those shown in FIG. 1.

The interface connector 110 is, for example, a plug connector conforming to USB Type-C. The interface connector 110 has terminals 111 to 115 corresponding to the arrangement of pins of the USB Type-C plug shown in FIG. 2A. The terminal 111 corresponds to a VBUS terminal, and is a power supply terminal for supplying electric power to a device (the wearable camera 200 in the first embodiment) connected to the USB Type-C plug 110. The terminal 112 corresponds to a CC (configuration channel) terminal, and outputs information indicating whether or not the AC adaptor 170 is connected to a power source connector 120, which will be described later, to the device connected to the USB Type-C plug 110. A terminal 113 corresponds to a VCONN terminal, and outputs information indicating whether or not the host device 180 is connected to an interface connector 130 to the device connected to the Type-C plug 110. A terminal 114 corresponds to a D+ terminal, and a terminal 115 corresponds to a D− terminal, and these are used for data communication with a device connected to the interface connector 110.

The power source connector 120 has a connection terminal 121 composed of a pin or a jack connectable to a pin or jack of the AC adaptor 170, and the connection terminal 121 can receive a power supply from the AC adaptor 170. The power source connector 120 of the first embodiment is assumed to have a form in which only an AC adaptor 170 having a particular power supply capability can be connected thereto. As a result, when the AC adaptor 170 is connected to the power source connector 120, the docking station 100 can acquire information about the power supply capability of the AC adaptor 170.

The interface connector 130 is, for example, a receptacle connector compliant with USB Type-B. The form of the USB Type-B receptacle 130 may be USB Mini-B or USB Micro-B. The USB Type-B receptacle 130 has terminals 131, 132 and 133. The terminal 131 corresponds to a VBUS terminal and receives a power supply from the host device 180 after it is connected to the USB Type-B receptacle 130. The terminal 132 corresponds to a D+ terminal, and the terminal 133 corresponds to a D− terminal, and is used for data communication.

A power source switching unit 140 connects one of the AC power source terminal 121 and the USB Type-B VBUS terminal 131 to the USB Type-C VBUS terminal 111. When a voltage is applied only from one of the terminals of the AC power source terminal 121 and the USB Type-B VBUS terminal 131, the power source switching unit 140 receives a power supply from the terminal from which the voltage is applied, and supplies power to the USB Type-C VBUS terminal 111. When voltages are applied to both the AC power source terminal 121 and the USB Type-B VBUS terminal 131, the power source switching unit 140 receives a power supply from the AC power source terminal 121 and supplies power to the USB Type-C VBUS terminal 111. A resistor 150 is an AC resistor connected between the AC power source terminal 121 and the CC terminal 112.

The AC resistor 150 has a resistance such that when a pull-down resistor of the CC terminal defined by USB Type-C is connected to the CC terminal 112, the voltage of the AC power source terminal 121 is divided and the voltage of the CC terminal 112 becomes, for example, 3.5 V.

A resistor 160 is a USB resistor connected between the USB Type-B VBUS terminal 131 and the VCONN terminal 113. The USB resistor 160 has a resistance such that when a pull-down resistor of the CC terminal defined by USB Type-C is connected to the VCONN terminal 113, the voltage of the USB Type-B VBUS terminal 131 is divided and the voltage of the VCONN terminal 113 becomes, for example, 3.5 V.

Next, components of the wearable camera 200 will be described with reference to FIG. 1. However, the wearable camera 200 has components other than those shown in FIG. 1.

The interface connector 210 is, for example, a receptacle connector compliant with USB Type-C. The USB Type-C receptacle 210 has terminals 211-215 corresponding to the arrangement of pins in the USB Type-C receptacle shown in FIG. 2B. The terminal 211 corresponds to a VBUS terminal, and is a power reception terminal for receiving a power supply from a device connected to the USB Type-C receptacle 210. The terminal 212 corresponds to a CC1 terminal, and is connected to a ground portion (GND) via a pull-down resistor 270 of the CC terminal defined by USB Type-C. The terminal 213 corresponds to a CC2 terminal, and is connected to GND via a pull-down resistor 270 of the CC terminal defined by the USB Type-C. When the docking station 100 and the wearable camera 200 are connected, the AC power source terminal 121 and the CC1 terminal 212, and the USB Type-B VBUS terminal 131 and the CC2 terminal 213 are arranged to be respectively connected. The terminal 214 and the terminal 215 respectively correspond to a D+ terminal and a D− terminal, and are connected to a CPU (Central Processing Unit) 260, which will be described later, and are used for data communication with the device connected to the USB Type-C receptacle 210.

A power source control unit 220 receives a power supply from the device connected to the USB Type-C receptacle 210 by the VBUS terminal 211 to charge a battery 230 or supply power to the system. The power source control unit 220 sets the current received from the VBUS terminal 211 by resistance values of resistors 243 to 246, which will be described later in FIG. 3 and which are connected between the power source control unit 220 and GND.

Figure 3:
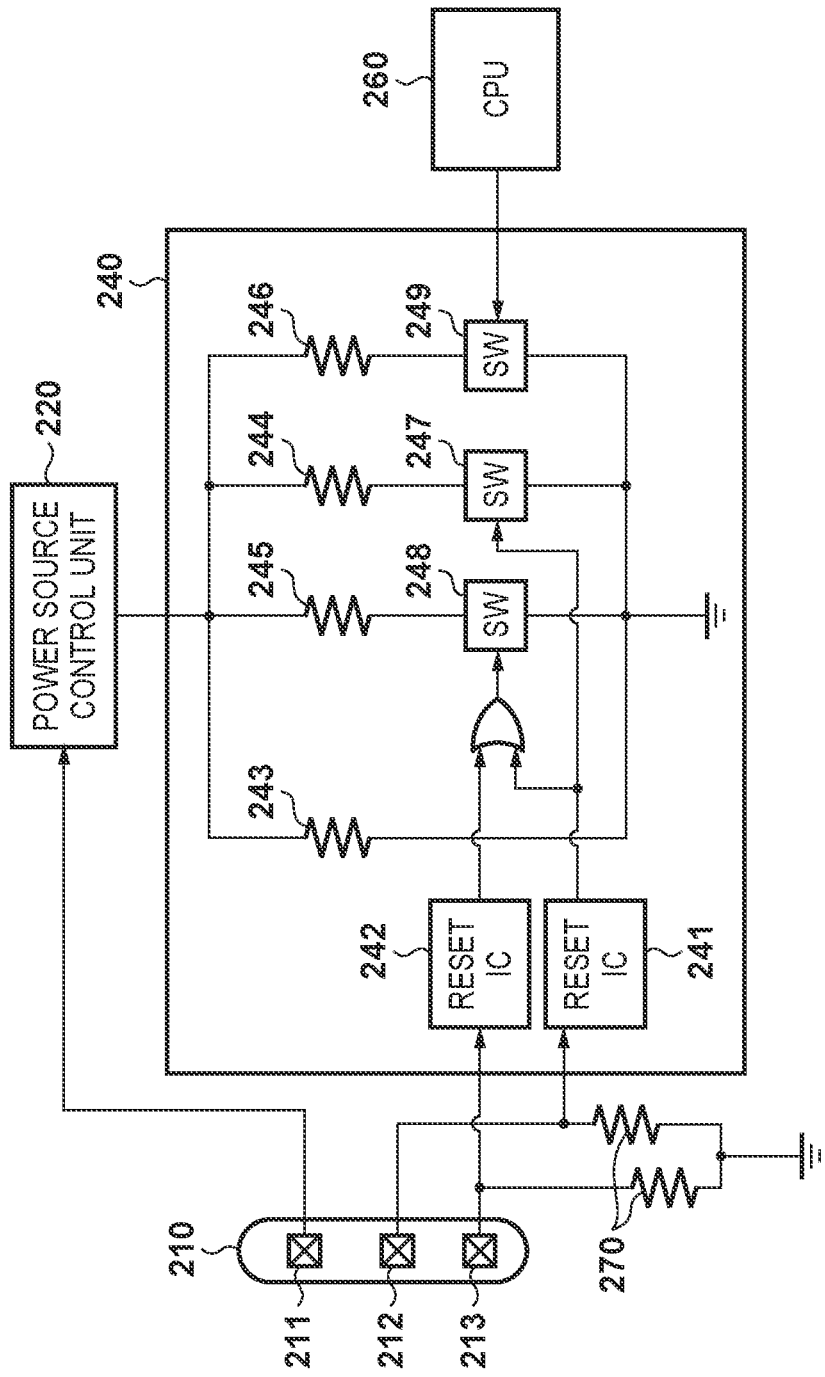
FIG. 3 is a block diagram for illustrating components of a power switching unit 240.

The power switching unit 240 determines the current at a time when the power source control unit 220 receives power from the VBUS terminal 211 in accordance with the operating states of switches 247, 248, and 249, which will be described later with reference to FIG. 3. The switches 247 and 248 described later in FIG. 3 are turned on or off in accordance with voltages applied to the CC1 terminal 212 and the CC2 terminal 213, and the switch 249 is turned on or off in accordance with a signal outputted from the CPU 260. When the switches 247, 248, and 249 are turned on or off, a resistance value for the resistors 243 to 246, which will be described later in FIG. 3 and which are connected between the power source control unit 220 and GND, is changed, and the current at a time when the power source control unit 220 receives power from the VBUS terminal 211 is thereby switched.

Referring now to FIG. 3, components of the power switching unit 240 will be described.

FIG. 3 is a block diagram showing components of the power switching unit in the first embodiment.

A reset IC 241 is connected to the CC1 terminal 212, and a reset IC 242 is connected to the CC2 terminal 213. A predetermined reset voltage of the reset ICs 241 and 242 is, for example, 3.2V.

A resistor 243 is a resistor connected between the power source control unit 220 and GND. Resistors 244, 245 and 246 are resistors connected between the power source control unit 220 and GND via the switches 247, 248 and 249. The switch 247 is controlled by the reset IC 241. The switch 248 is controlled by the logical OR of the reset IC 241 and the reset IC 242. When the voltage of the CC1 terminal 212 is equal to or higher than the reset voltage of the reset IC 241, the output of the reset IC 241 is turned on. Further, when the output of the reset IC 241 is turned on, the switches 247 and 248 are turned on, and the resistor 244 and the resistor 245 are connected to GND. Similarly, when the voltage of the CC2 terminal 213 is equal to or higher than the reset voltage of the reset IC 242, the output of the reset IC 242 is turned on. Further, when the output of the reset IC 242 is turned on, the switch 248 is turned on, and the resistor 245 is connected to GND. The switch 249 is controlled to be on or off by the CPU 260 which is described later, and when the switch 249 is turned on, the resistor 246 is connected to GND.

When all of the switches 247, 248, and 249 are turned off, for example, the power source control unit 220 sets a current limit value to 100 mA when a power supply from the VBUS terminal 211 is received. If only the switch 248 is turned on, for example, the power source control unit 220 sets a current limit value of 500 mA when receiving a power supply from VBUS terminal 211. When the switch 247 and the switch 248 are turned on, for example, the power source control unit 220 sets the current limit value to 3000 mA when a power supply is received from the VBUS terminal 211. When only the switch 249 is turned on, for example, the power source control unit 220 sets the current limit value to 1500 mA when a power supply is received from the VBUS terminal 211.

A connection detection unit 250 detects the voltages of the CC1 terminal 212 and the CC2 terminal 213. The CPU 260 is a control unit that controls the wearable camera 200. The CPU 260 communicates with a device connected to the Type-C receptacle 210 via the D+ terminal 214 and the D− terminal 215. FIG. 5 shows the relationship between the CC terminal voltage defined by USB Type-C and the power supply capability. When the voltage of the CC1 terminal 212 and the CC2 terminal 213 acquired from the connection detection unit 250 is within the CC terminal voltage range defined by USB Type-C, the CPU 260 determines the power supply capability of the docking station 100 based on the relationship shown in FIG. 5. If it is determined that the power supply capability of the docking station 100 is equal to or greater than a predetermined value (e.g., 1.5 A), the CPU 260 outputs a signal to the power switching unit 240.

Next, referring to FIG. 4, an exemplary operation of the wearable camera 200 when the docking station 100 and the wearable camera 200 are connected will be described.

Figure 4:
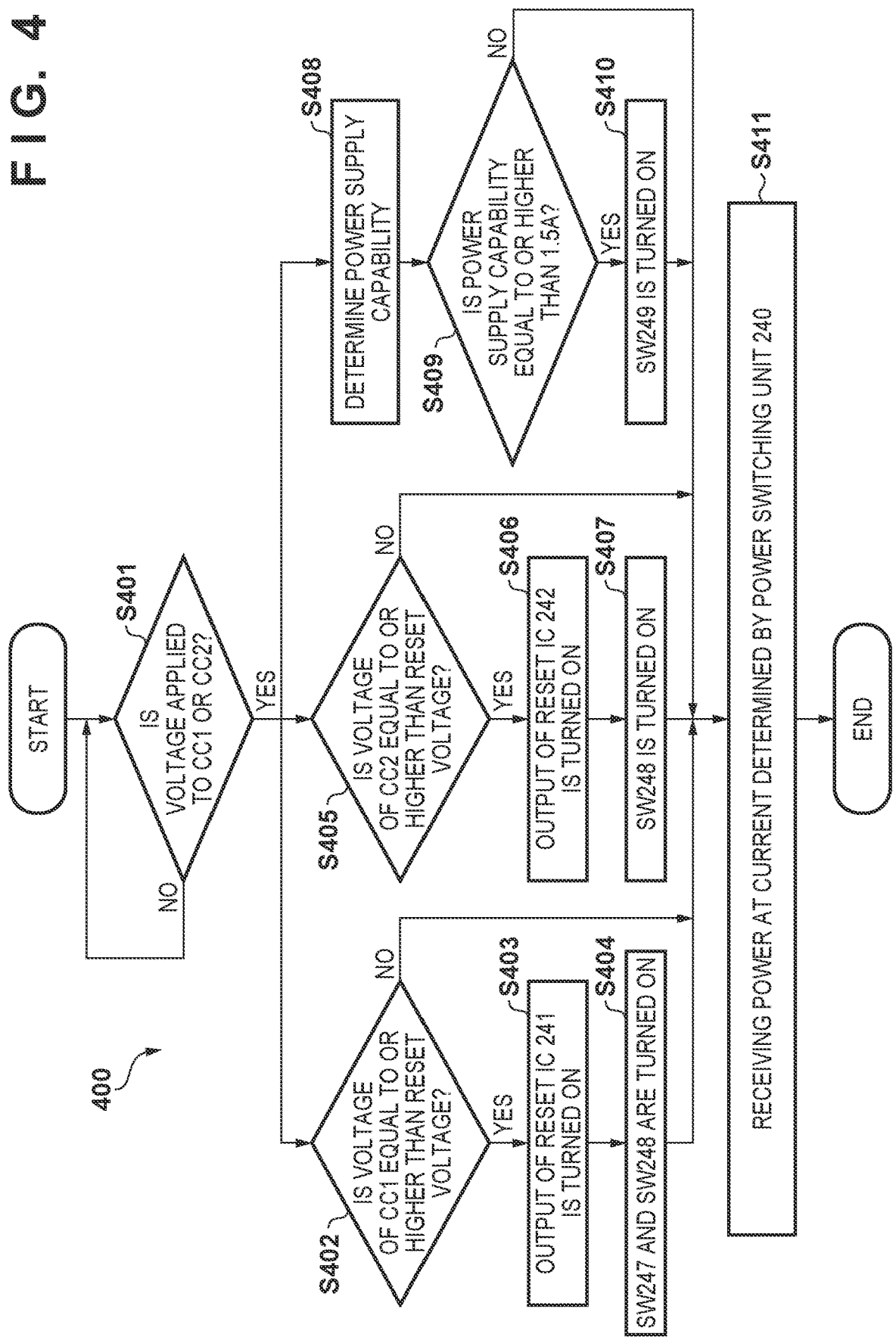
FIG. 4 is a flowchart for illustrating an example of process performed by the wearable camera 200.

FIG. 4 is a flow chart for illustrating a process 400 that is an exemplary process of switching power received by the wearable camera 200 from the docking station 100 according to the first embodiment.

The process 400 shown in FIG. 4 starts when the wearable camera 200 is connected to the docking station 100. The process 400 shown in FIG. 4 is controlled in accordance with a program executed by the CPU 260.

In step S401, the CPU 260 determines whether a voltage is applied to the CC1 terminal 212 or the CC2 terminal 213. If a voltage is applied to the CC1 terminal 212, the process 400 proceeds to step S402 (YES in step S401). If voltage is applied to the CC2 terminal 213, the process 400 proceeds to step S405 (YES in step S401). If a voltage is applied to both the CC1 terminal 212 and the CC2 terminal 213, the process 400 proceeds to step S408 (YES in step S401). If a voltage is neither applied to the CC1 terminal 212 nor the CC2 terminal 213, the process 400 repeats step S401 (NO in step S401).

The process from step S402 to step S404, which is performed when a voltage is applied to the CC1 terminal 212, is performed in parallel with the process from step S405 to step S407, which is performed when a voltage is applied to the CC2 terminal 213. The process from step S402 to step S404 is executed by a hardware circuit, and the process from step S405 to step S407 is also executed by a hardware circuit.

If the voltage of the CC1 terminal 212 is equal to or higher than the reset voltage of the reset IC 241 in step S402, the process 400 proceeds from step S402 to step S403 (YES in step S402).

In step S403, since the voltage of the CC1 terminal 212 is equal to or higher than the reset voltage of the reset IC 241, the output of the reset IC 241 is turned on. Thereafter, process 400 proceeds from step S403 to step S404.

In step S404, by the output of the reset IC 241 being turned on, the switch 247 and the switch 248 are turned on. Thereafter, process 400 proceeds from step S404 to step S411.

On the other hand, in step S402, if the voltage of the CC1 terminal 212 is equal to or lower than the reset voltage of the reset IC 241, the process 400 proceeds from step S402 to step S411 (NO in step S402).

If, in step S405, the voltage of the CC2 terminal 213 is equal to or higher than the reset voltage of the reset IC 242, the process 400 proceeds from step S405 to step S406 (YES in step S405).

In step S406, since the voltage of the CC2 terminal 213 is equal to or higher than the reset voltage of the reset IC 242, the output of the reset IC 242 is turned on. Thereafter, process 400 proceeds from step S406 to step S407.

In step S407, the switch 248 is turned on by the output of the reset IC 242 being turned on. Thereafter, process 400 proceeds from step S407 to step S411.

On the other hand, if the voltage of the CC2 terminal 213 is equal to or lower than the reset voltage of the reset IC 242 in step S405, the process 400 proceeds from step S405 to step S411 (NO in step S405).

The process from step S408 to step S410 is performed in parallel with the process from step S402 to step S404 and the process from step S405 to step S407.

In step S408, the CPU 260 acquires the voltage information of the CC1 terminal 212 and the CC2 terminal 213 from the connection detection unit 250, and determines the power supply capability of the docking station 100 according to the relationship shown in FIG. 5. Thereafter, process 400 proceeds from step S408 to step S409. When a voltage is applied to both of the CC1 terminal 212 and the CC2 terminal 213, the voltage of the larger one of the CC1 terminal 212 and the CC2 terminal 213 is preferentially determined.

In step S409, the CPU 260 determines whether the power supply capability of the docking station 100 is greater than or equal to a predetermined value (e.g., 1.5 A). If it is determined in step S409 that the power supply capability of the docking station 100 is greater than or equal to the predetermined value, the process 400 proceeds from step S409 to step S410 (YES in step S409).

In step S410, the CPU 260 turns on the switch 249. Thereafter, process 400 proceeds from step S410 to step S411.

On the other hand, if it is determined in step S409 that the power supply capability of the docking station 100 is less than the predetermined value (e.g., 1.5 A), the CPU 260 determines that the power supply capability of the docking station 100 is Default USB. If it is determined in step S409 that the power supply capability of the docking station 100 is less than the predetermined value (e.g., less than 1.5 A), the process 400 proceeds from step S409 to step S411 (NO in step S409).

In step S411, the power source control unit 220 determines the current received by the VBUS terminal 211 according to the resistance value pulled down by the power switching unit 240, and receives a power supply from the docking station 100 at the determined current.

Note that when the AC adaptor 170 or a power supply source of the host device 180 or the like is disconnected while the connection between the docking station 100 and the wearable camera 200 is maintained, the voltage of the CC1 terminal 212 or of the CC2 terminal 213 changes. Also in this case, the process 400 is executed.

As described above, according to the first embodiment, when the power supply capability of the docking station 100 connected to the wearable camera 200 changes, a part of the process 400 is executed by a hardware circuit instead of software. As a result, the processing time can be shortened as compared with the case where all of the process 400 is executed by software.

When the process 400 does not require immediacy, the CPU 260 may communicate with the wearable camera 200 using the D+ terminal 214 and the D− terminal 215, and the process 400 may be executed only by software.

Note that embodiments of the disclosure are not limited to the first embodiment described above. Changes or revisions made to the first embodiment of the disclosure within a scope of the disclosure are included in embodiments of the disclosure.

Second Embodiment

Various kinds of functions, processes, or methods described in the first embodiment can also be achieved by a personal computer, a microcomputer, a CPU (Central Processing Unit), or the like using a program.

In a second embodiment, a personal computer, a microcomputer, a CPU, or the like will be called a "computer X" below. Also, in the second embodiment, a program for controlling the computer X and achieving various kinds of functions, processes, or methods described in the first embodiments will be called a "program Y".

Various kinds of functions, processes, or methods described in the first embodiment are achieved by the computer X executing the program Y. In this case, the program Y is supplied to the computer X via a computer-readable storage medium. The computer-readable storage medium according to the second embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the second embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2018-126357, filed Jul. 2, 2018, which is hereby incorporated by reference herein in its entirety.

What is claimed is:

1. An electronic device comprising:
   a connector having a first terminal, a second terminal, and a third terminal;
   a power source control circuitry coupled to the first terminal, the power source control circuitry receiving power supplied from a power supply apparatus connected to the connector via the first terminal;
   a first switch coupled between the power source control circuitry and a ground, the first switch being used to change a resistance value between the power source control circuitry and the ground;
   a second switch coupled between the power source control circuitry and the ground, the second switch being used to change the resistance value between the power source control circuitry and the ground;
   a third switch coupled between the power source control circuitry and the ground, the third switch being used to change the resistance value between the power source control circuitry and the ground;
   a first circuitry coupled to the second terminal, the first circuitry controlling the first switch and the second switch to change the resistance value between the power source control circuitry and the ground in a case where a voltage of the second terminal is not less than a predetermined voltage;
   a second circuitry coupled to the third terminal, the second circuitry controlling the second switch to change the resistance value between the power source control circuitry and the ground in a case where a voltage of the third terminal is not less than the predetermined voltage; and
   a determination circuitry that determines a power supply capability of the power supply apparatus based on the voltage of the second terminal or the voltage of the third terminal, and controls the third switch to change the resistance value between the power source control circuitry and the ground in a case where the power supply capability of the power supply apparatus is not less than a predetermined value,
   wherein the power source control circuitry determines a current received by the first terminal based on the resistance value between the power source control circuitry and the ground.

2. The electronic device according to claim 1, wherein the resistance value between the power source control circuitry and the ground varies in accordance with operating states of the first, second and third switches.

3. The electronic device according to claim 1, wherein the determination circuitry turns on the third switch to change the resistance value between the power source control circuitry and the ground in the case where the power supply capability of the power supply apparatus is not less than the predetermined value.

4. The electronic device according to claim 1, wherein the power source control circuitry determines a first current as the current received by the first terminal in a case where the first, second and third switches are ON states, and
   the power source control circuitry determines a second current higher than the first current as the current received by the first terminal in a case where the second switch is ON state and the first and third switches are ON states.

5. The electronic device according to claim 1, wherein the power source control circuitry determines a first current as the current received by the first terminal in a case where the first, second and third switches are ON states, and
   the power source control circuitry determines a second current higher than the first current as the current received by the first terminal in a case where the first and second switches are ON states.

6. The electronic device according to claim 1, wherein the power source control circuitry determines a first current as the current received by the first terminal in a case where the first, second and third switches are ON states, and
   the power source control circuitry determines a second current higher than the first current as the current received by the first terminal in a case where the third switch is ON state and the first and second switches are ON states.

7. The electronic device according to claim 1, wherein the power source control circuitry determines a first current as the current received by the first terminal in a case where the first, second and third switches are ON states, the power source control circuitry determines a second current higher than the first current as the current received by the first terminal in a case where the second switch is ON state and the first and third switches are ON states, and the power source control circuitry determines a third current higher than the second current as the current received by the first terminal in a case where the first and second switches are ON states.

8. The electronic device according to claim 1, wherein the power source control circuitry determines a first current as the current received by the first terminal in a case where the first, second and third switches are ON states, the power source control circuitry determines a second current higher than the first current as the current received by the first terminal in a case where the third switch is ON state and the first and second switches are ON states, and the power source control circuitry determines a third current higher than the second current as the current received by the first terminal in a case where the first and second switches are ON states.

9. The electronic device according to claim 1, wherein the connector is a connector compliant with USB (Universal Serial Bus) Type-C connector.

10. The electronic device according to claim 1, wherein the first terminal is a VBUS terminal, and the second and third terminals are CC (configuration channel) terminals.

11. The electronic device according to claim 1, wherein the electronic device is a wearable device.

12. The electronic device according to claim 1, wherein the electronic device is an image capture apparatus.

* * * * *